(12) United States Patent
Piacenza et al.

(10) Patent No.: US 6,354,172 B1
(45) Date of Patent: Mar. 12, 2002

(54) MECHANICAL TIMER MECHANISM FOR VALVE CONTROL

(75) Inventors: Peter Piacenza, Highland Park; Amy Cotton, Schaumburg; Stephen Gaynes, Wonderlake; John H. Kargenian, Prospect Heights, all of IL (US)

(73) Assignee: Aquion Partners Limited Partnership, Elk Grove Village, IL (US)

( * ) Notice: Subject to any disclaimer, the term of this patent is extended or adjusted under 35 U.S.C. 154(b) by 0 days.

(21) Appl. No.: 09/494,899

(22) Filed: Jan. 31, 2000

(51) Int. Cl.$^7$ .......................... F16H 53/00; H01H 7/08; H01H 43/10; F17D 3/00; B01D 24/46
(52) U.S. Cl. ................. 74/568 T; 200/38 C; 200/38 R; 137/624.11; 210/190; 74/567; 74/569
(58) Field of Search ....................... 24/567–569, 568 T, 24/3.52; 210/190; 200/38 C, 38 R; 137/624.13, 624.11

(56) References Cited

U.S. PATENT DOCUMENTS

| | | | |
|---|---|---|---|
| 3,480,041 A | | 11/1969 | Whitlock |
| 3,487,719 A | | 1/1970 | Lyall et al. |
| 3,548,126 A | * | 12/1970 | Bassett .......................... 200/38 |
| 3,675,041 A | | 7/1972 | Elliott et al. |
| 3,705,278 A | | 12/1972 | Scott |
| 3,708,068 A | | 1/1973 | Tischler |
| 3,736,799 A | * | 6/1973 | Harris .......................... 74/3.52 |
| 3,857,293 A | * | 12/1974 | Godwin et al. ........ 74/568 T X |
| 3,874,412 A | | 4/1975 | Fleckenstein et al. |
| 3,976,101 A | | 8/1976 | Bassett |
| 4,079,636 A | * | 3/1978 | Altenschulte et al. ..... 74/568 T |
| 4,104,158 A | | 8/1978 | Davis |
| 4,470,911 A | | 9/1984 | Vaughan |
| 4,789,761 A | * | 12/1988 | Malone et al. ............ 200/38 C |
| 4,990,245 A | | 2/1991 | Wieme |
| 5,045,187 A | | 9/1991 | Suchanek |
| 5,590,687 A | * | 1/1997 | Vaughan ................ 137/624.13 |
| 5,879,559 A | | 9/1999 | Schreiner et al. |

FOREIGN PATENT DOCUMENTS

GB  2065979 A  *  7/1981  ............... 74/568 T

OTHER PUBLICATIONS

Culligan® Mark 89 and 812 Water Conditioners With Soft–Minder Metering Device Parts List, Jun., 1989, pp. 1–7.
Culligan® Mark 89 and 812 Water Conditioners with Soft–Minder Metering Device Installation and Operating Instructions, Mar., 1990, pp. 1–21.

* cited by examiner

Primary Examiner—Vinh T. Luong
(74) Attorney, Agent, or Firm—Mayer, Brown & Platt

(57) ABSTRACT

A mechanical timer to control multiple steps of a process comprising a first cam having a shaft, and a second cam having a shaft, wherein the shaft on the first cam extends into the shaft of the second cam. The rotational relationship between the first and second cams determines the length of time for at least one process step. First and second user adjustable elements are attached to the first and second cams. These user adjustable elements do not require any disassembly of the mechanical timer by the user or require any tools. A plurality of switches engage the cams to control various process steps.

6 Claims, 9 Drawing Sheets

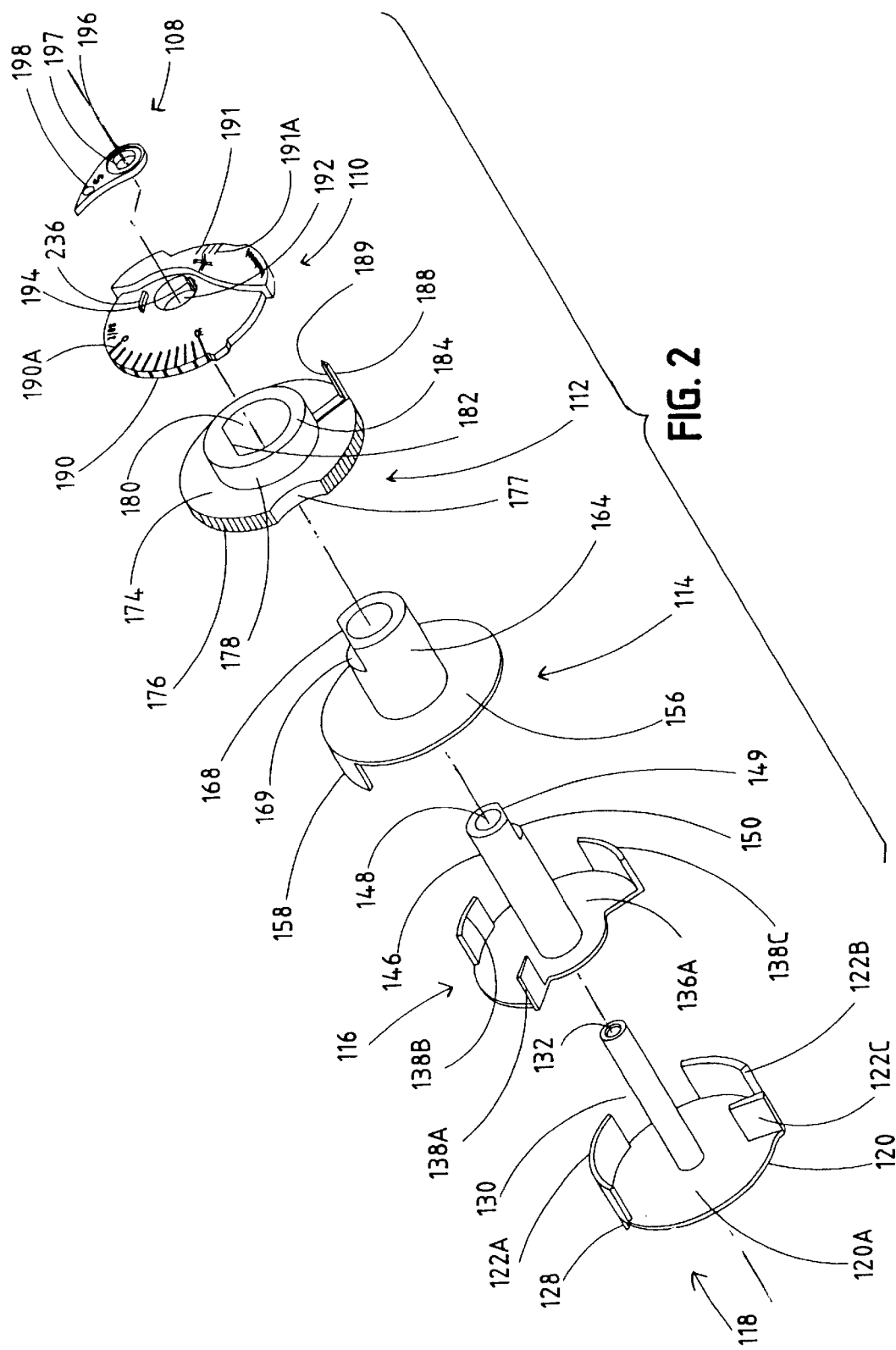

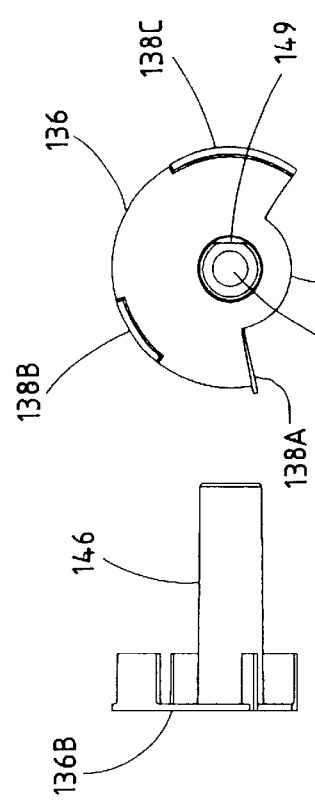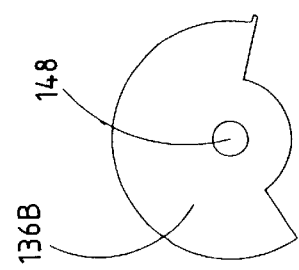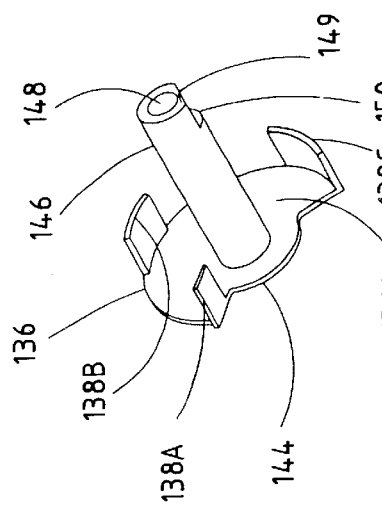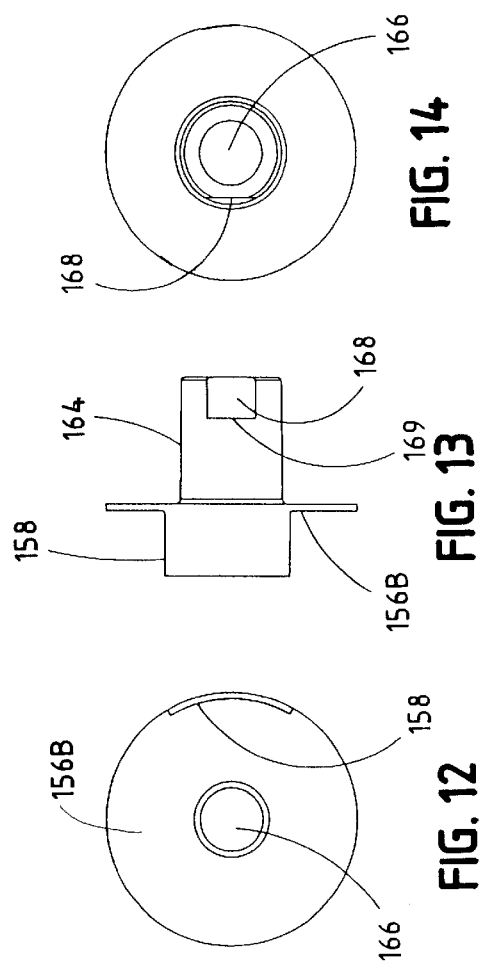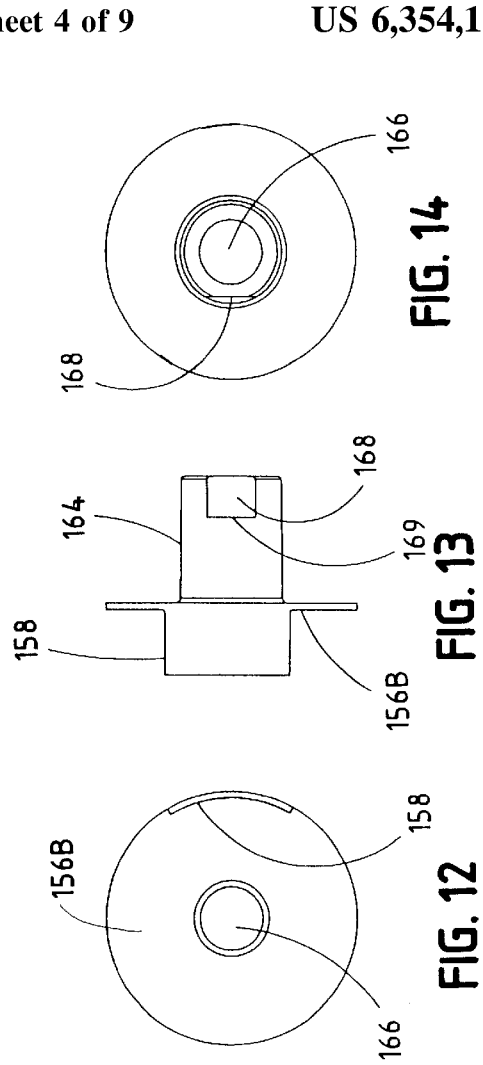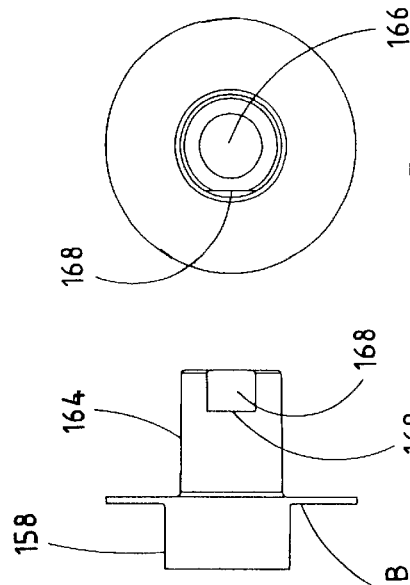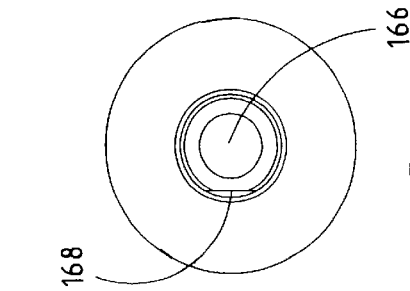

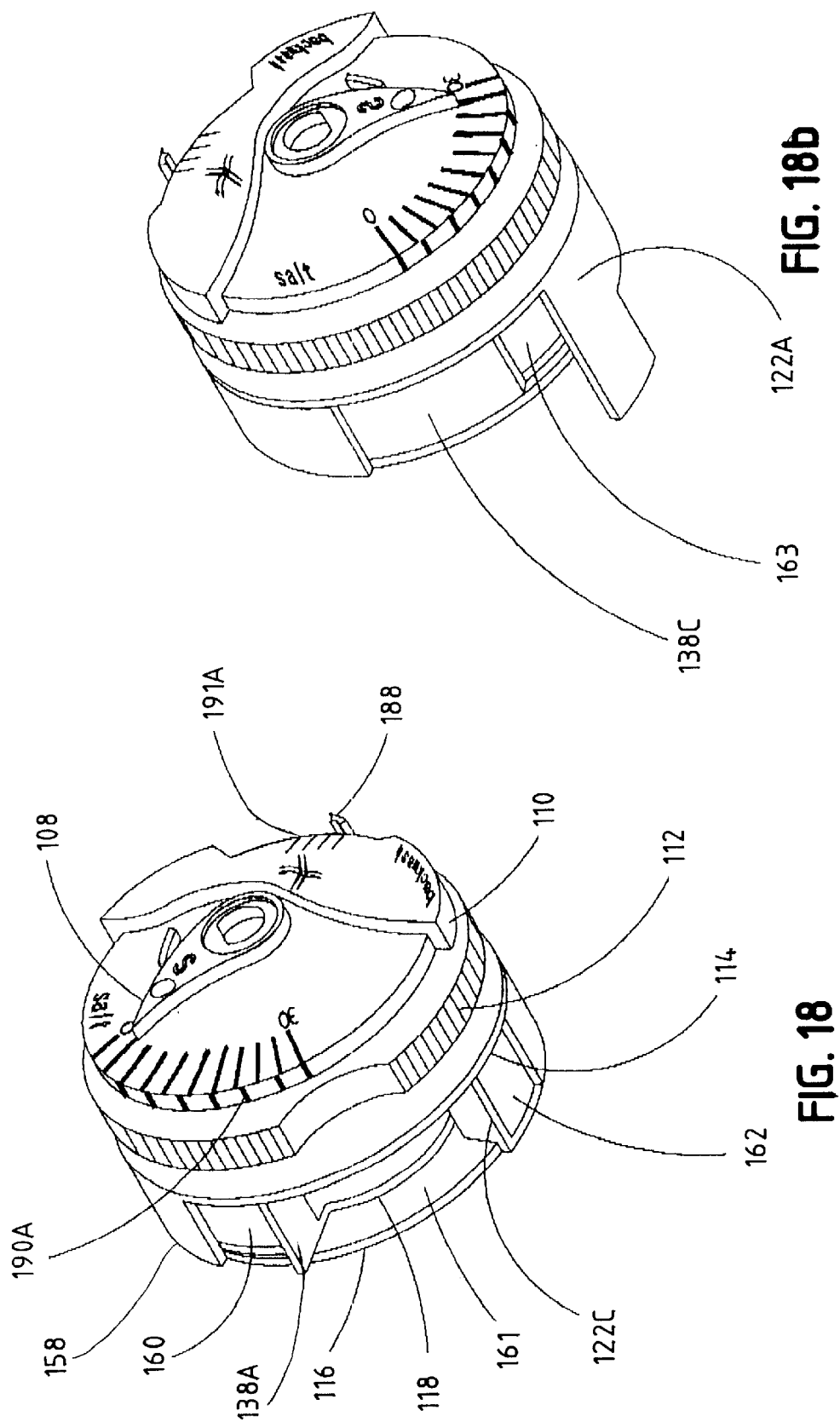

MECHANICAL TIMER MECHANISM FOR VALVE CONTROL

FIELD OF INVENTION

This invention relates generally to mechanical timers, and in particular to mechanical timers used to control various water softening cycles such as backwash, brine draw, brine fill and rinse.

BACKGROUND OF INVENTION

Water softening systems of the ion exchange type often include a tank having a bed of ion exchange resin, such as a polystyrene resin. The resin material is usually non-soluble and effectively acts as a permanent anion to which exchangeable cations, such as sodium ions ($Na^+$) can attach. During the softening process, the hardness-causing ions in the water, such as calcium ($Ca^{++}$) and magnesium ($Mg^{++}$) ions are exchanged with the "soft" sodium ions of the resin bed, thus producing softened water. This exchange occurs because the calcium and magnesium ions have a stronger affinity toward the resin bed than do the sodium ions. After prolonged contact of the resin bed with hard water, however, the ion exchange capacity of the resin bed diminishes, and regeneration of the resin bed must be performed.

Regeneration of the resin bed is normally performed in distinct steps during what is called the regeneration cycle. First, the bed is cleansed during a backwash cycle, where the normal water flow across the resin bed is reversed to expand the resin bed and remove any deposits that may be trapped in the resin bed. Second, a brine solution (i.e., an aqueous solution of sodium chloride or the like) from a separate brine tank is introduced to the resin bed. When the brine contacts the resin bed, the aforementioned ion exchange process is reversed, i.e., the "hard" ions in the resin bed are replaced with "soft" ions from the brine solution. Thereafter, a rinse cycle is normally provided to wash the brine from the resin bed. Lastly, the brine tank is refilled to form brine for the next regeneration cycle.

It is known to utilize mechanical timers to control the various regeneration cycles. Additionally, due to the particular demands placed upon the water softening system, it is often desirable for a user to vary the length of time for each individual regeneration cycle to adjust for various tank sizes and volumes of resin To accomplish this, mechanical regeneration timers may use movable fingers to time the individual regeneration cycles, such as the timer disclosed in U.S. Pat. No. 5,590,687. However, such timers often require disassembly or use of tools by the user to adjust the individual cycle times. This usually entails the removal or loosening of covers, screws, or other fasteners to access and/or move the regeneration cycle time adjustments. Disassembly of this nature is normally awkward and time consuming for users of water softening systems. Thus, there is a need for a mechanical timer to control water softener cycle times that allows users to easily and efficiently adjust the individual cycle times without any disassembly of the timer mechanism or use of tools.

These and other needs will become apparent upon a further reading of the following detailed description taken in conjunction with the drawings.

SUMMARY OF THE INVENTION

In one form of the invention, the aforementioned needs are fulfilled by a mechanical timer to control multiple steps of a process comprising a first cam having a shaft, and a second cam having a shaft, wherein the shaft on the first cam extends into the shaft of the second cam. The rotational relationship between the first and second cams determines the length of time for at least one process step. First and second user adjustable elements are attached to the first and second cams. These user adjustable elements do not require any disassembly of the mechanical timer by the user or require any tools. A plurality of switches engage the cams to control various process steps.

BRIEF DESCRIPTION OF THE DRAWINGS

FIG. 2 is an exploded view of a regeneration timer assembly;

FIG. 7 is a perspective view of a backwash cam;

FIG. 8 is a bottom view of FIG. 7;

FIG. 9 is a front view of FIG. 7;

FIG. 10 is a top view of FIG. 7;

FIG. 11 is a perspective view of a base cam;

FIG. 12 is a bottom view of FIG. 11;

FIG. 13 is a front view of FIG. 11;

FIG. 14 is a top view of FIG. 11;

FIG. 18 is a perspective view of an assembled regeneration timer;

FIG. 18b is another perspective view of an assembled regeneration timer;

DETAILED DESCRIPTION OF THE PREFERRED EMBODIMENT

Figure 1:
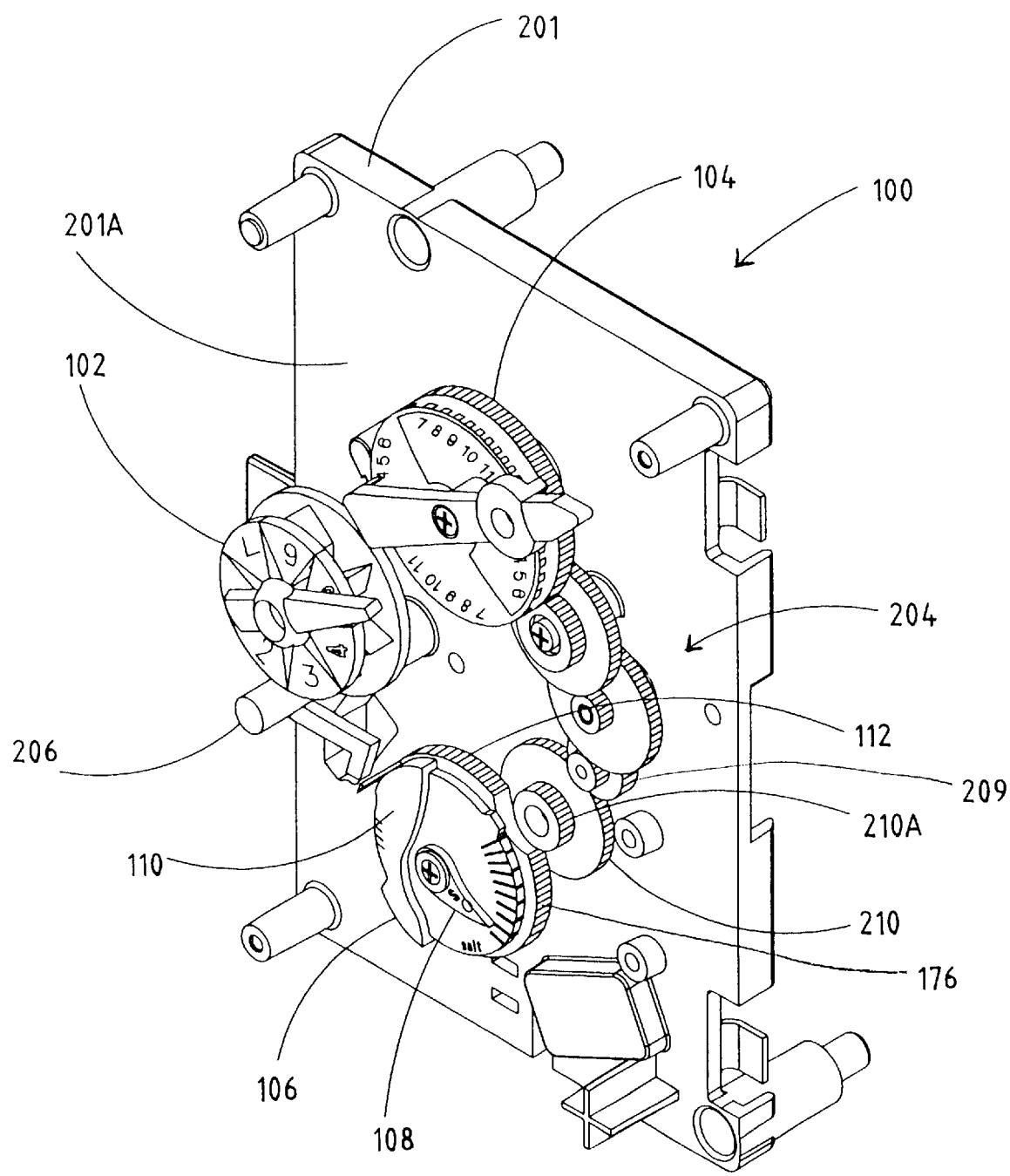
FIG. 1 is a perspective view of a mechanical timer assembly for regeneration of a water softening unit.
Figure 6:
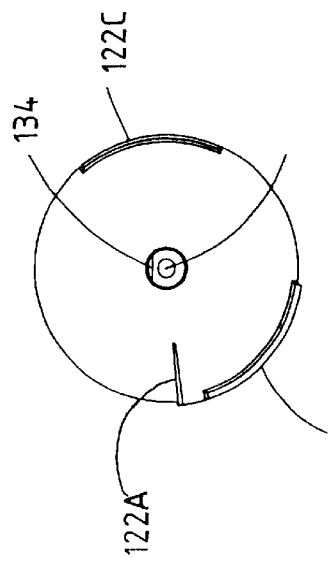
FIG. 6 is a top view of FIG. 3.
Figure 5:
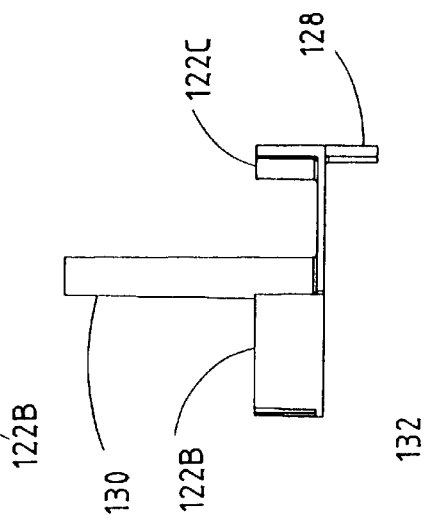
FIG. 5 is a front view of FIG. 3.
Figure 4:
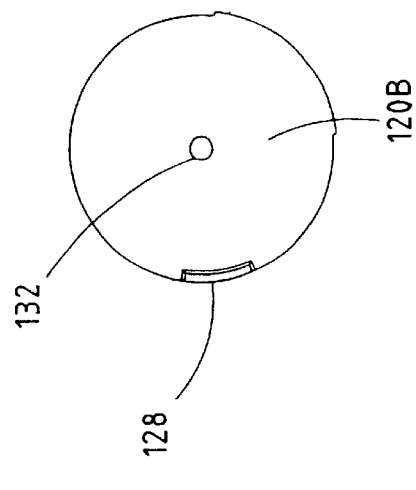
FIG. 4 is a bottom view of FIG. 3.
Figure 3:
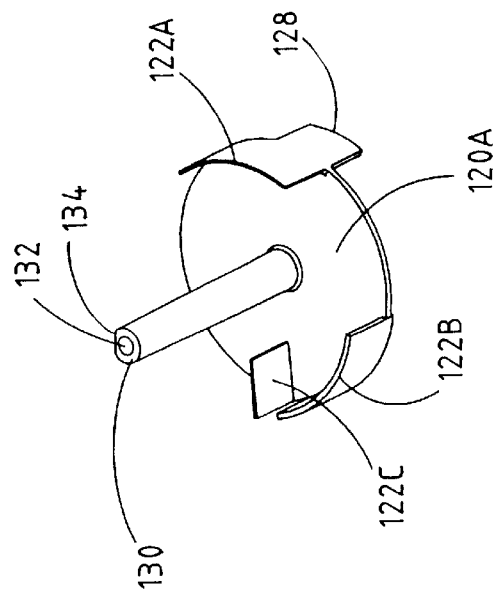
FIG. 3 is a perspective view of a brine cam.

While the present invention is capable of embodiment in various forms, there is shown in the drawings and will be hereinafter described a presently preferred embodiment with the understanding that the present disclosure is to be considered as an exemplification of the invention, and is not intended to limit the invention to the specific embodiment illustrated in the drawings and described herein.

For purposes of illustration, and not limitation, a mechanical control mechanism for valve control, designated generally as reference numeral 100 in FIG. 1, includes a day timer 102, a twenty-four hour timer 104, and a regeneration cycle control timer 106. The day timer 102 and twenty-four hour timer 104 are of known construction and do not separately form part of the present invention. As such, the day timer 102 and twenty-four hour timer 104 are not discussed in detail herein. Suffice it to say, the day timer 102, twenty-four hour timer 104, and regeneration control timer 106 all work in conjunction to time the regeneration of a water softening system.

Figure 20:
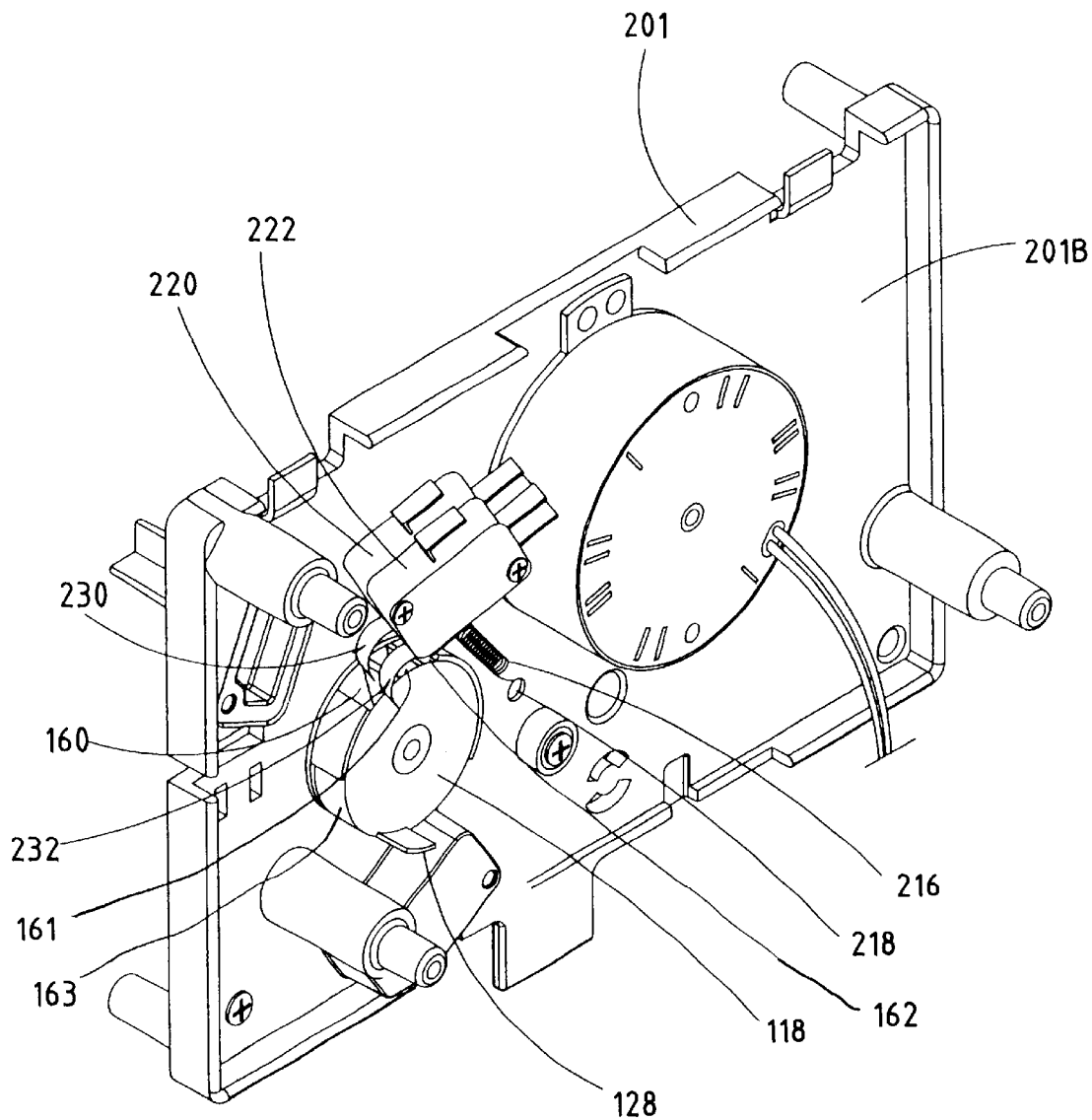
FIG. 20 is a rear perspective view of the mechanical timer of FIG. 19 in an assembled state.

As shown in FIG. 2, the regeneration cycle control timer 106 comprises a pointer 108, a dial 110, a gear 112, a base cam 114, a backwash cam 116 and a brine cam 118. The brine cam 118 as shown in FIGS. 2 through 6 comprises an annular disc 120 having a top surface 120A, bottom surface 120B (See FIG. 4), and an upper cam flange consisting of three segments 122A, 122B and 122C, conforming to the outer periphery of the disc 120. Preferably, segment 122A is wedge shaped to provide added strength. As discussed more fully herein, the upper flange segments 122A, 122B and 122C, when used in conjunction with the other cams, as described herein, create windows therebetween through which a cam follower as shown in FIG. 20 may enter. A lower cam flange 128 conforming to the outer periphery of disc 120 is located on the bottom surface 120B. Cam follower 232 as shown in FIG. 20 may ride on the surface of flange 128. The brine cam 118 also includes a shaft 130 attached to the center of the annular disc 120, and extending away from disc 120. The shaft 130 includes a bore 132 and a notch 134.

Similar to the brine cam 118, the backwash cam 116 as shown in FIGS. 2 and 7–10 includes an annular disc 136 having a top surface 136A, bottom surface 138B (See FIG. 8) and a cam flange consisting of three segments 138A, 138B and 138C conforming to the outer periphery of the disc 136. As can be appreciated from the drawings, disc 136 is a smaller diameter than disc 120, so as to enable the backwash cam to sit within the brine cam 119 when the regeneration timer 106 is fully assembled. Segment 138A is preferably wedge shaped to provide added strength. The flange segments 138A, 138B and 138C create windows therebetween through which a cam follower 230 as shown in FIG. 20 may enter. Wedge shaped cutout 144 provides for free movement of the wedge shaped cam segment 122C of brine cam 118 within the wedge shaped cutout when the regeneration timer assembly is assembled as shown in FIGS. 18 and 20. The backwash cam 116 also includes a shaft 146 attached to the center of the annular disc 136, and extending away from disc 136. The shaft 146 includes a bore 148, a top surface 149 and a notch 150. It should be appreciated that the diameter of the bore 148 on the backwash cam 116 is approximately the diameter of the shaft 130 of the brine cam 118, thereby allowing the shaft 130 to telescope into the bore 148 for rotational movement therein.

The base cam 114 as shown in FIGS. 2, and 11–14, includes an annular disc 156 having a top surface 156A, bottom surface 156B (See FIG. 12), and cam flange segment 158 conforming to the outer periphery of the disc 156. As can be appreciated from the drawings, disc 156 is of a larger diameter than discs 136 and 132, thereby allowing the brine cam 118 and backwash cam 116 to be enveloped by flange 158 when in an assembled position as shown in FIG. 18. The flange 158 has a window 160 through which a cam follower 230 may enter as shown in FIG. 20. The base cam 114 also includes a shaft 164 attached to the center of the annular disc 156, and extending away from the flange 158. The shaft 164 includes a top surface 165, bore 166 and a notch 168, the notch having a ledge 169. As can be appreciated by viewing the drawings, the diameter of the bore 166 is approximately the diameter of the shaft 146 of the backwash cam 116, thereby allowing the shaft 146 to telescope into the bore 166 for rotational movement therein. It should be appreciated at this point that although three cams are depicted herein, more or less cams can be used to practice the invention herein, depending on the particular application desired.

Figure 15:
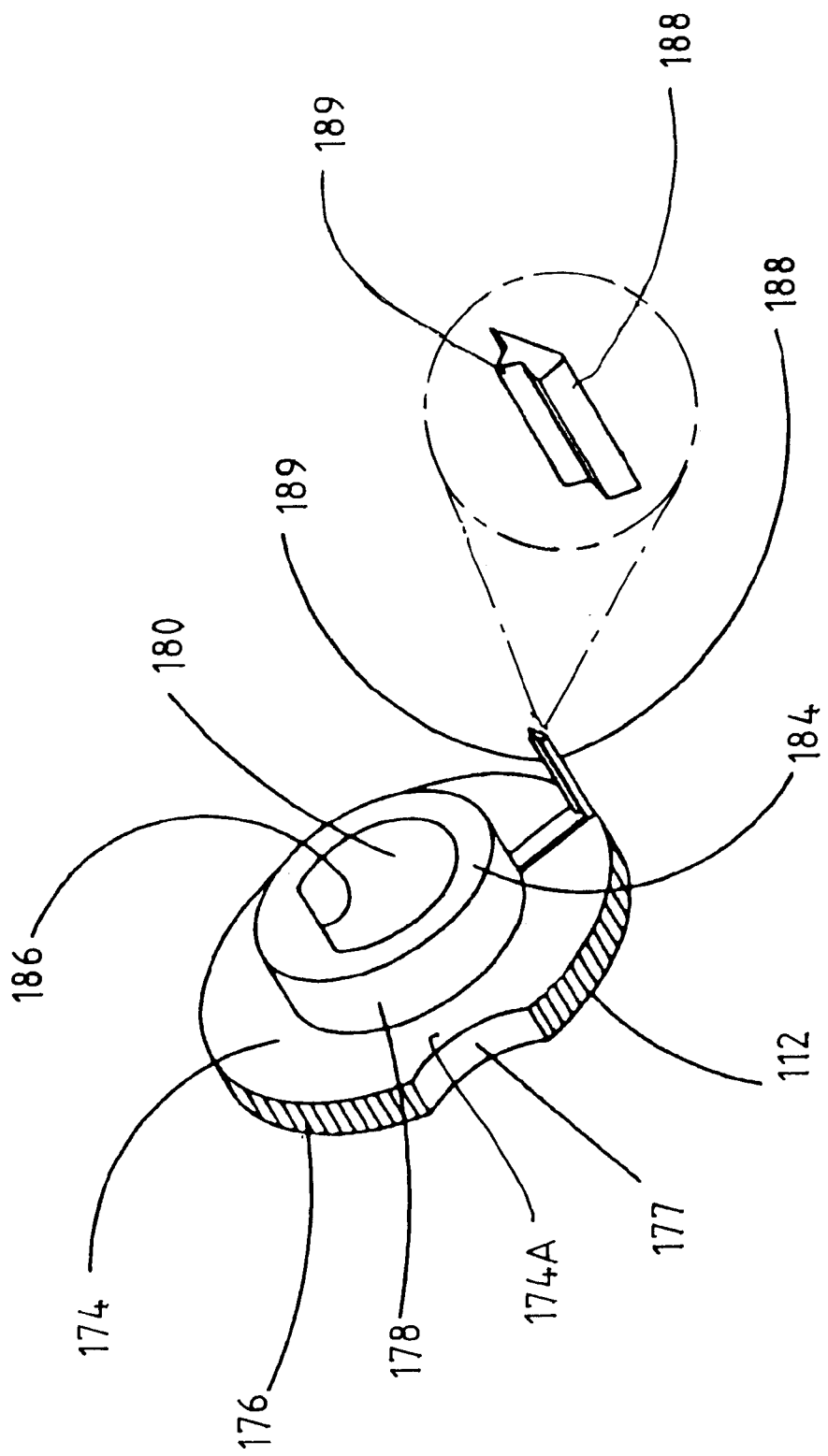
FIG. 15 is a perspective view of a gear.

The gear 112, as shown in FIGS. 2 and 15, includes an annular disc 174 having a top surface 174A. The outer periphery of the disc 174 contains a plurality of gear teeth 176 and an arcuate notch 177. The gear 112 also includes a shaft 178 attached to the disc 174. The shaft 178 has a bore 180, which includes a key 182. The key 182 extends from a top surface 184 of the shaft 178 and partially into the bore 180, and terminates in a ledge (not shown). Extending radially outwardly from shaft 178 is a pointer 188, which is attached to the gear 112. The pointer 188 includes a tooth 189 for selectively engaging notches 191A on dial 110 (FIG. 12).

The diameter of bore 180 is approximately the diameter of shaft 164, thereby allowing shaft 164 to be telescoped into bore 180 until ledge 169 meets the ledge of key 182, at which time the top surface 184 of shaft 178 is flush with the top surface 165 of shaft 164, and the gear 112 and the base cam 114 are axially spaced apart.

Figure 16:
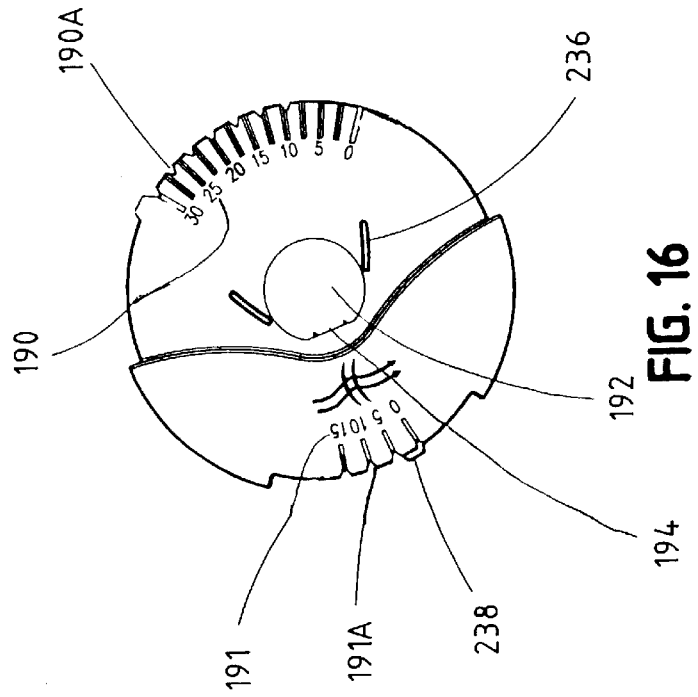
FIG. 16 is a perspective view of an adjustment dial.

The dial 110 as shown in FIGS. 2 and 16 is annular in shape and has indicia 190 and 191 on an upper surface 110A thereof. In a preferred embodiment, the indicia 190 represents a salt setting in pounds, and indicia 191 represents a backwash setting in minutes. The dial 110 also includes notches 190A corresponding to indicia 190 and notches 191A corresponding to indicia 191. An aperture 192, located generally in the center of dial 110, includes a key 194. The key 194 is engageable with the notch 150 of backwash cam 116 to provide conjoint rotation between the dial 110 and the backwash cam 116.

Figure 17:
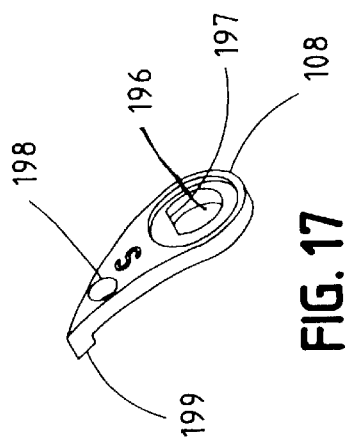
FIG. 17 is a perspective view of a pointer.

The pointer 108 as shown in FIGS. 2 and 17 can take any convenient shape, such as the depicted teardrop shape, and comprises a first aperture 196, which includes a key 197. The pointer 108 also includes a second aperture 198 which may be used to view the indicia 190 on the dial 110 therethrough, and a tooth 199 for selectively engaging notches 190A. As those skilled in the art will appreciate, although a tooth and notch arrangement is depicted herein for selective engagement, any other structure capable of selective engagement may be utilized, such as a spring loaded ball and socket configuration. Preferably, the pointer 108 is used to indicate the current salt dosage. The key 197 is engageable with the notch 134 of brine cam 118 to provide conjoint rotation between the pointer 108 and the brine cam 118.

To assemble the regeneration timer as shown in FIG. 18, the shaft 130 of brine cam 118 is first inserted into the bore 148 of backwash cam 116. Next, shaft 146 of backwash cam 116 is inserted into the bore 166 of base cam 114. At this point, the backwash cam is sandwiched in between brine cam and base cam as shown in FIG. 18, and the various cam flanges on the brine, backwash and base cam cooperate to form adjustable windows 160–163.

Next, the shaft 164 of base cam 114 is inserted into the bore 180 of gear 112, making sure to align the key 182 with the notch 168. At this point, the shaft 146 of the backwash cam 116 is protruding from the bore 166 of the base cam 114 so as to expose notch 150, and the shaft 130 of brine cam 118 is protruding from the bore 148 of backwash cam 116 so as to expose notch 134.

The shaft 146 is then inserted into the aperture 192 of the dial 110, making sure to align notch 150 and key 149. It should be noted that although a key structure is depicted for joining certain elements for conjoint rotation, it should be understood that any joining mechanism such as splines, pins or adhesives may be used.

Figure 19:
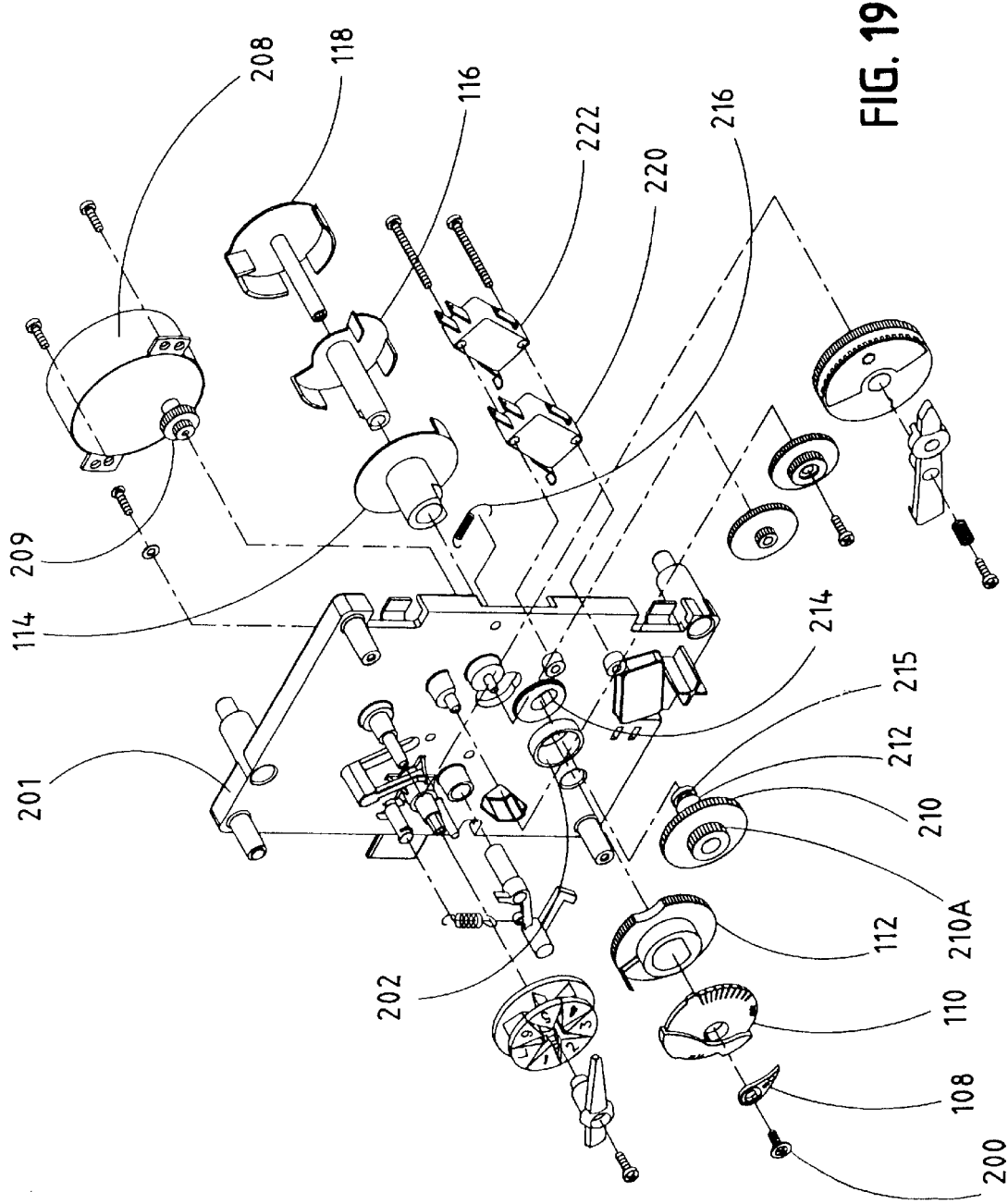
FIG. 19 is an exploded view of a mechanical timer assembly for regeneration of a water softening unit.

Lastly, the shaft 130 is inserted into the aperture 196 of the pointer 108, making sure to align notch 134 and key 197. Preferably a fastener, such as a screw 200 shown in FIG. 19, is inserted into bore 132 to hold the regeneration timer assembly together.

It should now be appreciated that when the pointer 108, dial 110, gear 112, base cam 114, backwash cam 116, and brine cam 118 are assembled as described above, apertures 196, 192 and 180 and bores 166, 148, and 132 are axially aligned. It should further be appreciated that base cam 114, backwash cam 116 and brine cam 118 are independently rotatable with respect to each other when in an assembled position.

Preferably, the regeneration timer assembly is assembled within a timer plate 201 as shown in FIG. 1. In such a configuration, the pointer 108, dial 110 and gear 112 are located on the top surface 201A of timer plate 201, and the base cam 114, backwash cam 116 and brine cam 118 are located on the bottom surface 201B of timer plate 201, as shown in FIG. 20. In such a configuration, shafts 130, 146, and 164 pass through an aperture 202 in timer plate 201 as seen in FIG. 19.

Also located on or adjacent the top surface 201A of timer plate 201 is the day timer 102, twenty-four hour timer 104, gear cluster 204 and regeneration actuator arm 206. Drive motor 208 on bottom surface 201B of timer plate 201 drives gear cluster 204 via drive motor gear 209 (See FIG. 1). The gear cluster 204 in turn provides rotational movement to the day timer 102, twenty-four hour timer 104 and regeneration timer 106. Preferably, the drive motor is a 24 volt 60 hertz motor that is driven at 1/30 rotations per minute.

Gear 210 has gear teeth 210A and an axle 212 that is placed within slot 214, as best seen in FIG. 19. The end of axle 212 protrudes from the bottom surface 201B of timer plate 201 and contains an annular recess 215. Spring 216 is anchored on one end to aperture 218 (FIG. 20) and engages on its other end the annular recess 215 to bias the axle 212 against one side of the slot 214. Spring 216 is preferably of a sufficient tension to bias the axle 212 against one side of the slot 214 during normal operation, yet allow the axle 212 to temporarily slide within the slot 214, under conditions as will be described below. As depicted in FIG. 1, gear 210 is driven by the drive motor gear 209, and engages the gear teeth 176 on gear 112 to rotate the regeneration timer 106, such as in a clockwise direction when viewed from the top surface 201A of timer plate 201.

Also included on the back side 201B of timer plate 201 are cam switches 220 and 222 as shown in FIGS. 19 and 20. Preferably, cam switches 220 and 222 are micro-switches that include cam followers 230 and 232 respectively. In a preferred embodiment, cam switch 220 controls the timing of all regeneration cycles and cam switch 222 provides an indication of timer 106's home position, causing the device driven by this timer to return to home in the event of a malfunction in positioning. However, it should be understood that the function and/or the position of the cams and cam switches may be varied if desired.

Operation of the present invention as described above allows a user of a water softening system to adjust easily and efficiently various parameters of a regeneration cycle. In accordance with the invention as set forth herein, a user may vary the parameters for the brine draw, brine fill and backwash regeneration cycles by adjusting the user-accessible settings on the regeneration timer assembly 106 without any disassembly of the mechanical timer assembly or any use of tools. In particular, the user may rotate the pointer 108 with respect to the dial 110 to set a desired salt dosage as indicated by indicia 190. When this is done, the shaft 130, brine cam 118, and cam segments 122A, 122B, and 122C rotate conjointly therewith because of the shaft 130 being attached to pointer 108 via notch 134 and key 197.

The length of the brine draw cycle is determined by the window 161 formed between cam segment 122C on brine cam 118 and cam segment 138A on backwash cam 116. This window increases in size as pointer 108 is adjusted toward higher salt dosages on indicia 190. At the same time the brine fill time is determined by the window 163 formed between cam segment 122A on brine cam 118 and cam segment 138C on backwash cam 116. This window likewise increases in size as pointer 108 is adjusted toward higher salt dosages. These windows are closed completely when the salt dosage is set to zero. In a preferred embodiment however, a pointer stop 236 is included on dial 110 to prevent a zero salt dosage. A zero salt dosage is undesirable because without a brine solution passing over the resin bed, no regeneration will occur. In a preferred embodiment, the salt settings are in pounds and in five (5) pound intervals from zero (0) to (30) pounds.

The backwash time is set in a similar fashion by moving dial 110 with respect to gear 112. As the dial 110 is moved, shaft 146 to which the dial is connected rotates conjointly therewith, thus rotating backwash cam 116 and segment 138A. The pointer 188 on gear 112 indicates the current backwash time by pointing to indicia 191. As shaft 146 is rotated, cam segment 138A is rotated within flange 158 to adjust the size of window 160 formed between cam segment 138A and flange 158. When the backwash time is set to zero, the window is totally closed and when the backwash time is set to full, the window is at its maximum size. In a preferred embodiment, however, a pointer stop 238 as best seen in FIG. 16 is provided on the outer periphery of the dial 110 to prevent the pointer 188 from reaching a zero backwash setting. A zero backwash setting is undesirable because without a backwash cycle, residue may remain on the resin bed, thus preventing effective regeneration. In a preferred embodiment, the backwash settings are in five minute intervals from zero (0) to fifteen (15) minutes. As those skilled in the art will appreciate, the cam structure described herein may take a variety of forms that allow for a window between two points on a cam to be adjusted by a user, including stacked (as opposed to nested)cam structures having discs of equal size with arcuate wedges attached on a surface thereof to adjust window sizes on other cams.

After the user has chosen the desired regeneration cycle parameters on the regeneration timer 106 and chosen the desired day(s) and time of regeneration by adjusting the day timer 102 and the twenty-four hour timer 104, the user may leave the timer mechanism unattended. While unattended, the timer motor 208 will turn at a pre-determined rate (preferably 1/30 rotations per minute) to drive the gear cluster 204 and, in turn, the day and twenty-four hour timers, 102 and 104. When regeneration is not occurring, the regeneration timer 106 remains in an idle position, where gear 112 is not engaged with gear 210. This occurs when arcuate notch 177 on gear 112 is in between the respective axes of the gear 112 and the gear 210.

When the user-selected day and time for regeneration occurs, the day timer 102 will actuate the regeneration actuator arm 206 in a direction toward the regeneration timer 106. Alternatively, the actuator arm may be manually actuated by the user for instant regeneration, thereby bypassing the day and twenty-four hour timers 102 and 104.

The actuator arm 206, upon actuation, comes into contact with the pointer 188, thereby urging gear 112 in a clockwise direction. As the gear 112 is rotated in a clockwise direction, gear teeth 176 come into contact with gear teeth 210A on gear 210. To allow for proper meshing of gear teeth 176 and 210A, drive gear 210, slides within the slot 214 in a direction away from the regeneration timer 106. Once proper meshing of the gears 176 and 210A is achieved, spring 216 retracts the gear 210 to its original position.

With the gear 112 engaged with gear 210, the timing motor 208 drives the gear 210 in a counter-clockwise direction, and hence the regeneration timer 106 in a clockwise direction. As one skilled in the art will appreciate, the entire regeneration timer 106 turns as one unit due to the interlocking nature of the pointer 108, dial 110, gear 112, base cam 114, backwash cam 116 and brine cam 118. Thus, as gear 112 is turned, base cam 114 rotates conjointly therewith due to notch 168 and key 182. The tooth 189, which is integral with gear 112, causes dial 110 to rotate conjointly with the gear 112 due to the tooth 189 being selectively engaged with notches 191A. Consequently, the dial 110 causes backwash cam 116 to rotate conjointly therewith due to notch 150 and key 194. Lastly, dial 110 causes pointer 108 to rotate conjointly therewith due to tooth 199 selectively engaging notches 190A. Consequently, brine cam 118 rotates conjointly with pointer 108 due to notch 134 and key 197.

Immediately after gears 112 and 210 mesh and the entire regeneration timer mechanism 106 begins rotating as one unit, the cam follower 230 of switch 220 falls into window 160 as best seen in FIG. 20. This triggers a motor (not shown), or other actuator device, to open a valve (not shown) which begins the backwash process. As is known in the art, all regeneration cycles are controlled in a similar fashion. The backwash cycle continues until the cam follower 230 is lifted out of the window 160 by reaching the end of window 160 due to the continued rotation of the regeneration timer 106. As stated above, the size of the window 160 is dictated by easily-accessible user settings.

As the regeneration timer 106 continues in a clockwise direction, cam follower 230 of switch 220 falls into the window 161. This causes the brine draw cycle to begin. The brine draw cycle continues until cam follower 230 is lifted out of window 161 by reaching the end of window 161 due to the continued rotation of the regeneration timer 106. Again, as stated above, the size of the window 161 is dictated by easily-accessible user settings.

After the brine draw cycle, the cam follower 230 of switch 220 falls into window 162, which causes the rinse cycle to begin. The rinse cycle continues until the rotational movement of the regeneration timer 106 causes the cam follower 230 to reach the end of window 162 and lift out of window 162. Unlike windows 160 and 161, window 162 in a preferred embodiment cannot be varied in size by user settings. However, it should be appreciated that the size of window 162 could also be varied with similar structures used to vary windows 160 and 161.

Lastly, after the rinse cycle, cam follower 230 of switch 220 falls into window 163 to start the brine fill cycle, which refills the brine tank. The brine fill cycle continues until the rotational movement of the regeneration causes the cam follower 230 to reach the end of window 163 and lift out of window 163. It should be appreciated that brine draw window 161 and brine fill window 163 are both adjusted by a single movement of brine cam 118. Thus, when a user changes salt dosage by moving pointer 108, the appropriate adjustments to brine draw and brine fill times occur automatically. It should also be appreciated that an adjustable window system as described herein could be used to provide an independent, user-settable, window for the brine fill cycle.

After the brine fill cycle is complete, the regeneration timer 106 continues to rotate until arcuate notch 177 encounters gear 210, thus disengaging the regeneration timer 106 gear 112 from gear 210.

Cam follower 232 of switch 222 is designed to be engaged by cam flange 128 of brine cam 118, as best seen in FIG. 20, to provide a homing feature. Follower 232 climbs onto flange 128 as the regeneration timer 106 nears the end of its cycle. At this point the device driven by this timer (i.e., a valve actuating motor) should have reached its home, or service, position due to the actions of switch 220 and follower 230 as described above. However, if, for any reason, the device has not reached its home position when follower 232 climbs flange 128, switch 222 will operate to drive the device to its home position, thereby resynchronizing the mechanism.

The foregoing description of a preferred embodiment of the invention has been presented for purposes of illustration and description, and is not intended to be exhaustive or to limit the invention to the precise form disclosed. The description was selected to best explain the principles of the invention and their practical application to enable others skilled in the art to best utilize the invention in various embodiments and various modifications as are suited to the particular use contemplated. It is intended that the scope of the invention not be limited by the specification, but be defined by the claims set forth below.

What is claimed is:

1. A mechanical timer comprising:

a first cam having at least one window;

a second cam axially aligned with said first cam, said second cam having an adjusting member, wherein said second cam rotates independently with respect to said first cam;

a control element attached to said second cam for rotating said second cam and said adjusting member with respect to said first cam, thereby adjusting the size of said window, wherein said control element comprises a pointer with a tooth that engages a notch on a dial and said dial is axially aligned with said first and second cams; and a cam follower that engages said first cam;

wherein said adjustment element can be adjusted by a user without any tools.

2. A mechanical timer as claimed in claim 1, wherein said second cam is seated within said first cam.

3. A mechanical timer as claimed in claim 2, wherein said adjusting member is a wedge.

4. A mechanical timer as claimed in claim 1, wherein said mechanical timer further comprises a third cam axially aligned with said first and second cams, and wherein said third cam rotates independently with respect to said first and second cams.

5. A mechanical timer as claimed in claim 4, wherein said first, second and third cams each have at least one cam segment that interact to form adjustable windows.

6. A mechanical timer as claimed in claim 5, wherein said first and second cams have at least three cam segments.

* * * * *